United States Patent [19]

Mitsuzuka et al.

[11] Patent Number: 5,616,849
[45] Date of Patent: Apr. 1, 1997

[54] TORQUE SENSOR

[75] Inventors: Katsuya Mitsuzuka; Hironori Kato, both of Miyagi-ken, Japan

[73] Assignee: Alps Electric Co., Ltd., Tokyo, Japan

[21] Appl. No.: 560,617

[22] Filed: Nov. 20, 1995

[30] Foreign Application Priority Data

Nov. 21, 1994 [JP] Japan ................................. 6-286688

[51] Int. Cl.⁶ .................................................. G01L 3/00
[52] U.S. Cl. ........................... 73/862.322; 73/862.321
[58] Field of Search ........................................ 340/670, 671, 340/672; 73/862.191, 862.322, 862.321, 862.325, 862.326, 862, 862.01, 862.08

[56] References Cited

U.S. PATENT DOCUMENTS

| | | |
|---|---|---|
| 3,691,825 | 9/1972 | Dyer ................................. 73/862.325 |
| 4,320,317 | 3/1982 | Bowey ................................... 340/671 |
| 5,280,729 | 1/1994 | Aoki et al. . | |
| 5,377,550 | 1/1995 | Thompson, III ................... 73/862.322 |

Primary Examiner—Richard Chilcot
Assistant Examiner—Ronald Biegel
Attorney, Agent, or Firm—Guy W. Shoup; Patrick T. Bever

[57] ABSTRACT

A torque sensor is provided which does not easily generate hysteresis in an output curve from a sensing device thereof and in which abnormality in detecting the rotational torque can therefore be prevented. An input shaft and an output shaft are connected to each other through a torsion bar. An actuator portion, having a semicircular cross sectional shape, and a stopper are, such that a predetermined interval is maintained, provided for a first mounting frame integrally formed with the input shaft. A sensing device comprising of a slide-operation-type variable resistor is secured to a second mounting frame integrally formed with the output shaft. A lever provided for the sensing device and having a circular cross sectional shape is caused to project between the actuator portion and the stopper. Moreover, the sensing device includes a restoring spring for urging the lever in one direction so that the elasticity of the restoring spring realizes point contact between the actuator portion and the lever;

7 Claims, 3 Drawing Sheets

FIG. I

TORQUE SENSOR

BACKGROUND OF THE INVENTION

1. Field of the Invention

The present invention relates to a torque sensor for use in, for example, a power steering apparatus for an automobile.

2. Description of the Prior Art

FIG. 5 is a perspective view showing a conventional torque sensor of the foregoing type. As shown in FIG. 5, a steering shaft is divided into an input shaft 1 and an output shaft 2. The input shaft 1 and the output shaft 2 are connected to each other by a torsion bar 3 made of special alloy steel. Each end of the torsion bar 3 is inserted into the input shaft 1 and the output shaft 2, and they are secured by pins 4 and 5, respectively. A first mounting frame 6 is integrally formed with the input shaft 1. A prism-like actuator portion 7 extends downwards from the leading end of the first mounting frame 6. An adjust screw 8, which is brought into contact with a first side surface of the actuator portion 7, is fastened into the leading end of the first mounting frame 6 by means of a screw thread. A second mounting frame 9 is integrally formed with the output shaft 2 and has, at the leading end thereof, an outer case 10c for the sensing device 10 secured thereto. The sensing device 10 comprises a slide-operation-type variable resistor for transmitting a resistance value, which corresponds to the position of a prism-like lever 10a extending away from the shafts 1 and 2, when the lever 10a reciprocates within an elongated hole 10b. The lever 10a is, by a restoring spring (not shown) included in the outer case 10c, urged into a direction in which the lever 10a is brought into contact with a second side surface of the actuator portion 7.

When a steering wheel (not shown) attached to the leading end of the input shaft 1 is rotated clockwise or counterclockwise, the torsion bar 3 is twisted so that a torsional angle, which is the difference in the phase caused from the rotation, is made. The thus-made torsional angle is, as rotational torque, detected by the sensing device 10. If the input shaft 1 is rotated, for example, clockwise, the first mounting frame 6 and the actuator portion 7 are also rotated in the same direction. Thus, the actuator portion 7 is rotated in a direction in which the actuator portion 7 presses against the lever 10a of the sensing device 10, thereby moving the lever 10a within the elongated hole 10b. As a result, the sensing device 10 transmits a change in the voltage corresponding to the torsional angle. On the contrary, if the input shaft 1 is rotated counterclockwise, the first mounting frame 6 and the actuator portion 7 are also rotated in the same direction. Thus, the actuator portion 7 is rotated in a direction in which the actuator portion 7 moves apart from the lever 10a of the sensing device 10. However, since the lever 10a follows the movement of the actuator portion 7 due to the elasticity of the restoring spring, the sensing device 10 similarly transmits the voltage change which corresponds to the torsional angle. In accordance with the thus-detected rotational torque, a rotational assist power is supplied to a power assist mechanism (not shown) attached to the leading end of the output shaft 2.

With the foregoing conventional torque sensor, a dimensional error or a mounting error of the components including the sensing device 10 results in a necessity of adjusting the position, at which the actuator portion 7 and the lever 10a are in contact with each other, to be a neutral position, that is, a zero point adjustment is required. The zero point adjustment is performed in such a manner that the adjust screw 8 is rotated to deform the actuator portion 7. However, with the foregoing conventional torque sensor, the actuator portion 7 and the lever 10a are prism-like shape, thus, the contact between the actuator portion 7 and the lever 10a is performed along a surface or a line. Therefore, even if the zero point adjustment has been performed accurately, there arises a problem in that an excess change in frictional force generated between the actuator portion 7 and the lever 10a occurring during the operation inhibits the lever 10a to follow the movement of the actuator portion 7 and, therefore, hysteresis easily takes place in an output curve from the sensing device 10. If the restoring spring included in the sensing device 10 is separated from the lever 10a or the restoring spring is ruptured, the lever 10a cannot follow the movement of the actuator portion 7. Thus, detection of the rotational torque encounters a problem.

SUMMARY OF THE INVENTION

In view of the foregoing, an object of the present invention is to provide a torque sensor exhibiting excellent detection accuracy.

To achieve the foregoing object, according to the present invention, there is provided a torque sensor comprising: an input shaft which is rotated; an output shaft connected to the input shaft through a torsion bar; a sensing device provided with one of the input shaft and the output shaft and arranged to detect the relative difference in the rotational phase between the two shafts; and an actuator portion provided with the other of the input shaft and the output shaft, and arranged to be brought into contact with a drive portion of the sensing device, wherein the sensing device is provided with a restoring spring for urging the drive portion into a direction in which the drive portion is brought into contact with the actuator portion, and the drive portion and the actuator portion respectively have contact portions having curved surfaces for realizing point contact between the drive portion and the actuator portion.

In addition to the foregoing structure, a slide-operation-type variable resistor is employed as the sensing device, and the other of the input shaft and the output shaft is provided with a stopper such that the drive portion is located between the stopper and the actuator portion.

Since the drive portion of the sensing device, provided with one of the input shaft and the output shaft, and the actuator portion, provided for the other of the shaft and the output shaft have contact portions having curved surfaces, the drive portion of the sensing device and the actuator portion are applied with the elasticity of the restoring spring to move while being in point contact with each other. Thus, hysteresis cannot easily be generated in the output curve from the sensing device. Even if the restoring spring included in the sensing device is separated from the drive portion or ruptured, the drive position is located between the actuator portion and the stopper which are moved integrally, thereby preventing excess separation of the drive portion. Therefore, abnormality in detecting the rotational torque can be prevented.

Other and further objects, features and advantages of the invention will appear more fully from the following description.

DETAILED DESCRIPTION OF THE PREFERRED EMBODIMENTS

A preferred embodiment of the present invention will now be described with reference to the drawings.

Figure 1:
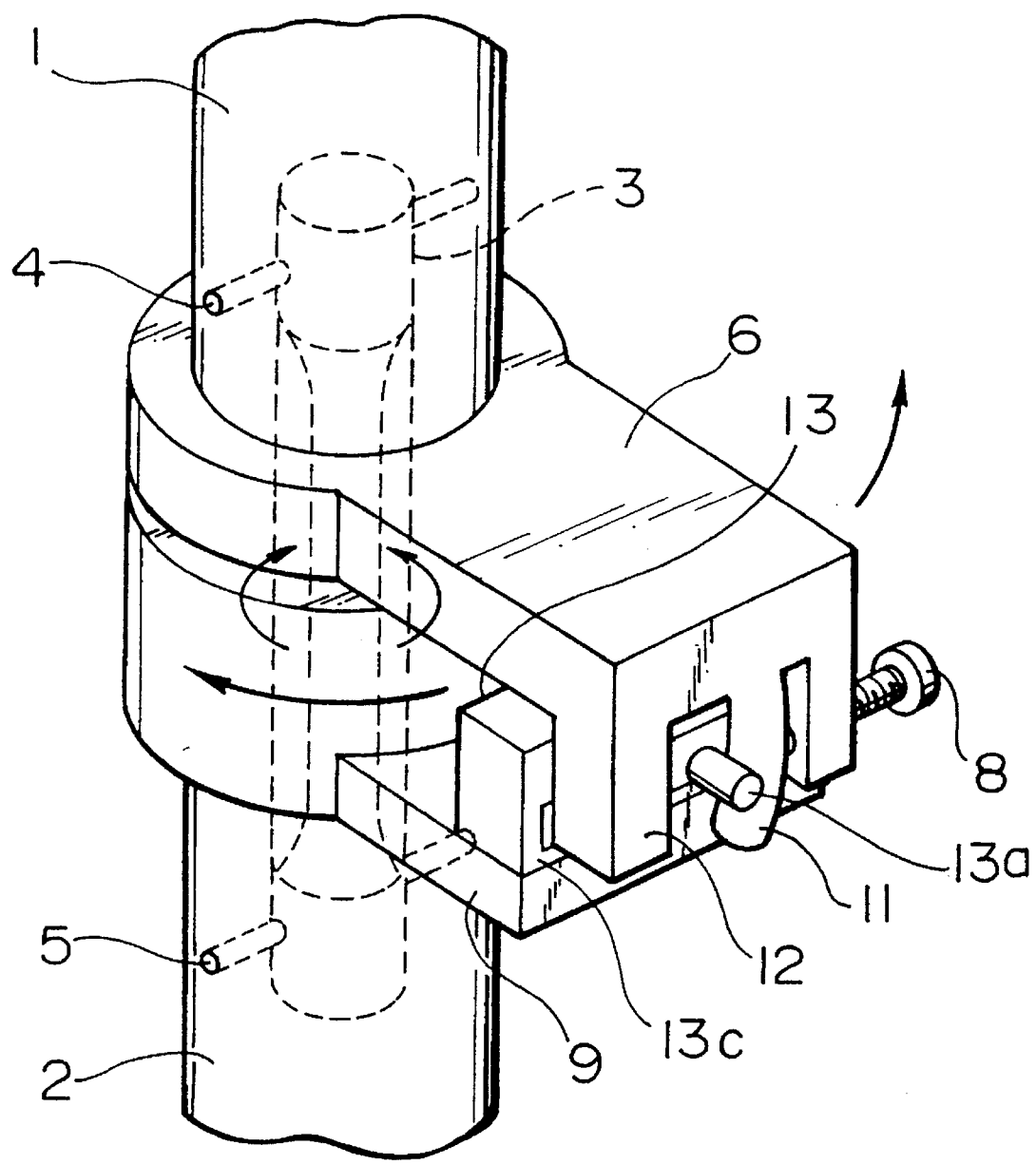
FIG. 1 is a perspective view showing an embodiment of a torque sensor according to the present invention.
Figure 2:
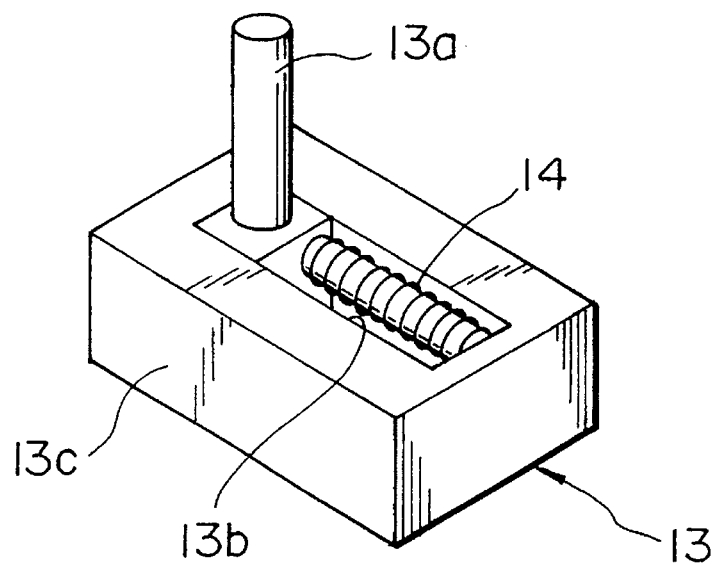
FIG. 2 is a perspective view showing a sensing device provided for the torque sensor.
Figure 3:
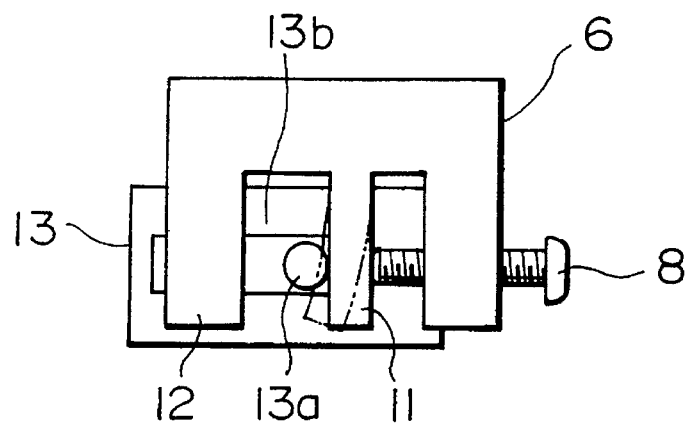
FIG. 3 is a front view of a zero point adjustment mechanism provided for the torque sensor.
Figure 4:
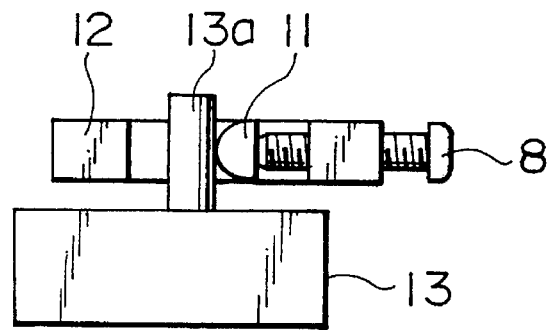
FIG. 4 is a bottom view of the zero point adjustment mechanism.
Figure 5:
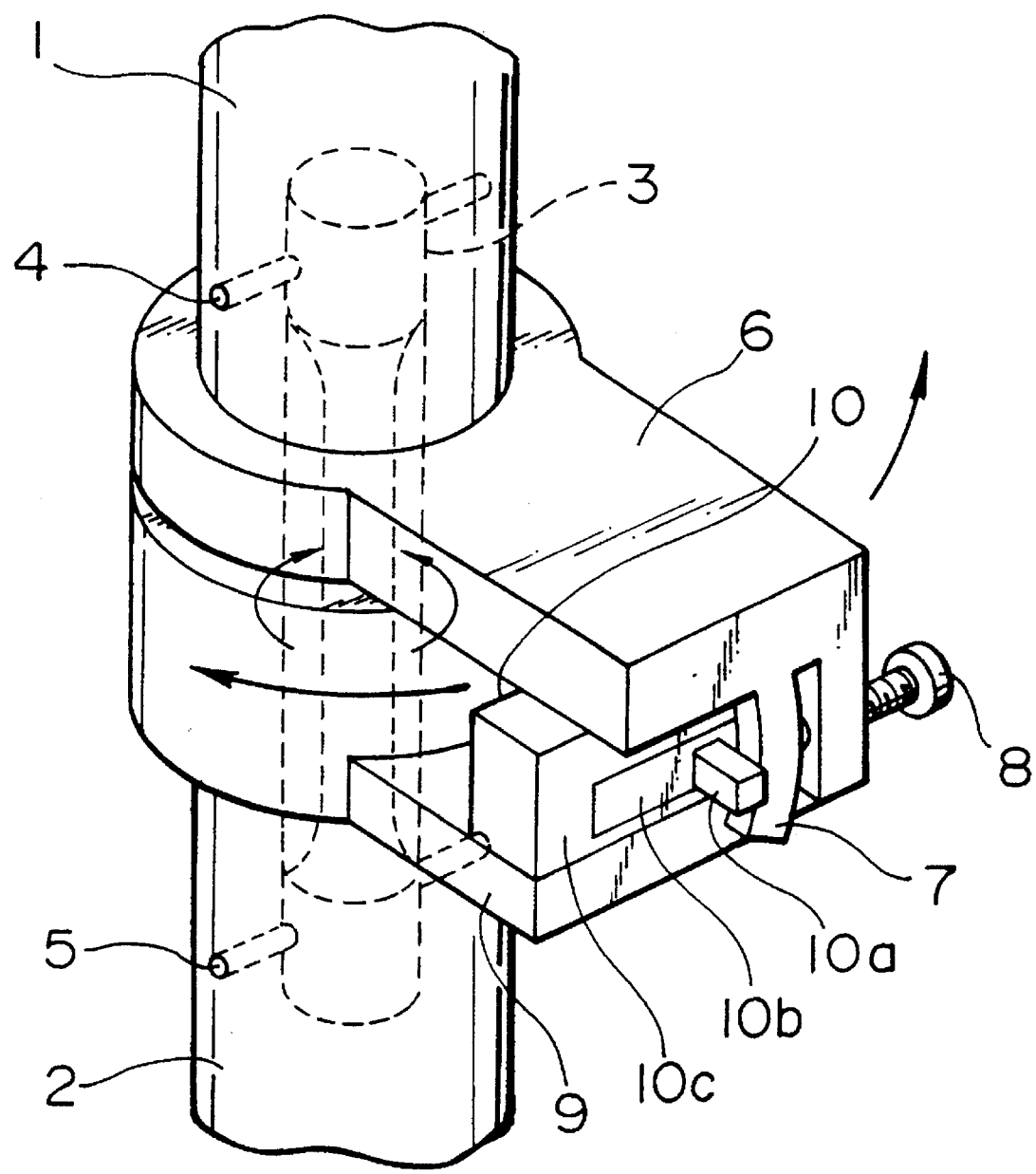
FIG. 5 is a perspective view of a conventional torque sensor.

FIG. 1 is a perspective view showing an embodiment of a torque sensor according to the present invention. FIG. 2 is a perspective view showing a sensing device provided for the torque sensor. FIG. 3 is a front view of a zero point adjustment mechanism provided for the torque sensor. FIG. 4 is a bottom view of the zero point adjustment mechanism. The elements which are the same as or corresponding to those shown in FIG. 5 are given the same reference numerals.

As shown in the drawings, the steering shaft is divided into an input shaft 1 and an output shaft 2. The input shaft 1 and the output shaft 2 are connected to each other by a torsion bar 3 made of special alloy steel. Each end of the torsion bar 3 is inserted into the input shaft 1 and the output shaft 2, and they are secured by pins 4 and 5, respectively. A first mounting frame 6 is integrally formed with the input shaft 1. An actuator portion 11, having a semicircular cross sectional shape, downwards extends from the leading end of the first mounting frame 6. Moreover, an adjust screw 8, which is brought into contact with a flat portion of the actuator portion 11, is fastened into the leading end of the first mounting frame 6 by means of a screw thread. A stopper 12 is integrally formed with the leading end of the first mounting frame 6, the stopper 12 facing a curved portion of the actuator portion 11 in such a manner that a predetermined interval is maintained. A second mounting frame 9 is integrally formed with the output shaft 2. The second mounting frame 9 having a sensing device 13 secured thereto and comprising a slide-operation-type variable resistor. As shown in FIG. 2, the sensing device 13 comprises an outer case 13c having an elongated hole 13b, a lever 13a outwards projecting from the elongated hole 13b and having a circular cross sectional shape, and a restoring spring 14 included in the outer case 13c and arranged to urge the lever 13a toward an end of the elongated hole 13b. When the lever 13a reciprocates along the elongated hole 13b, a resistance value corresponding to the position of the lever 13a is, as a change in the voltage, transmitted. The lever 13a is disposed between the actuator portion 11 and the stopper 12, the lever 13a being applied with elastic force from the restoring spring 14 so as to be urged in a direction, in which the lever 13a is always in contact with the curved surface of the actuator portion 11.

The thus-structured torque sensor is used in such a manner that the actuator portion 11 and the lever 13a are previously adjusted to a neutral position, that is, they are previously subjected to the zero point adjustment. The zero point adjustment is performed by rotating the adjust screw 8 to deform the actuator portion 11. Since the surface of contact between the actuator portion 11 and the lever 13a are curved surfaces as shown in FIGS. 3 and 4, the actuator portion 11 and the lever 13a are in point contact with each other, and then they are subjected to the zero point adjustment.

When the torque sensor according to the present invention is used, clockwise or counterclockwise rotation of a steering wheel (not shown) attached to the leading end of the input shaft 1 causes the torsion bar 3 to be twisted. As a result, a torsional angle, which is the difference in the phase caused from the rotation, is made between the input shaft 1 and the output shaft 2. The thus-made torsional angle is, as the rotational torque, detected by the sensing device 13. If the input shaft 1 is rotated clockwise, for example, the first mounting frame 6 and the actuator portion 11 are also rotated clockwise so that the actuator portion 11 is rotated in a direction in which the actuator portion 11 presses against the lever 13a of the sensing device 13 and against the restoring spring 14. As a result, the lever 13a is moved in the elongated hole 13b so that a change in the voltage corresponding to the foregoing torsional angle is transmitted. On the contrary, if the input shaft 1 is rotated counterclockwise, the first mounting frame 6 and the actuator portion 11 are also rotated counterclockwise. Thus, the actuator portion 11 is rotated in a direction in which the actuator portion 11 is moved apart from the lever 13a of the sensing device 13. However, since the lever 13a follows the movement of the actuator portion 11 due to the elasticity of the restoring spring 14, a change in the voltage corresponding to the torsional angle can be transmitted similarly. The contact between the actuator portion 11 and the lever 13a is a point contact as described above, thereby generating significantly weak frictional force between the actuator portion 11 and the lever 13a. Therefore, the lever 13a accurately follows the movement of the actuator portion 11 and, thus, hysteresis cannot easily be generated in the output curve from the sensing device 13. Even if the lever 13a is not supplied with the elastic force during usage due to separation of the restoring spring 14 from the lever 13a or the rupture of the restoring spring 14, the lever 13a is brought into contact with either the actuator portion 11 or the stopper 12 which are integrally moved. Thus, the maximum separation between the lever 13a and the actuator portion 11 is limited.

Although the foregoing embodiment employs the slide-operation-type variable resistor as the sensing device 13, a slide-operation-type encoder or a rotation-operation-type variable resistor or encoder may be employed in place of the slide-operation-type variable resistor.

Although the foregoing embodiment has the structure that the actuator portion 11 is integrally formed with the input shaft 1 and the sensing device 13 is integrally formed with the output shaft 2, an inverted structure may be employed in which the actuator portion 11 is integrally formed with to the output shaft 2 and the sensing device 13 is integrally formed with the input shaft 1.

Although the foregoing embodiment is such that the actuator portion 11, having a semicircular cross sectional shape and the lever 13a having a circular cross sectional shape, are in point contact with each other, the shapes of the actuator portion 11 and the lever 13a are not limited to the foregoing shapes. The necessity lies in that the surface of contact between the actuator portion 11 and the lever 13a has a projective curvature.

As described above, the present invention has the structure that the drive portion of the sensing device and the actuator portion are formed in such a manner that their contact portions are respectively formed into curved surfaces. Therefore, the portion are acted upon by the elastic force from the restoring spring when they are moved, thereby preventing easy generation of hysteresis in the output curve from the sensing device. Even if the restoring spring included in the sensing device is separated from the drive portion or ruptured, the drive portion will remain between the stopper and the actuator portion which move integrally. Thus, abnormality in detecting the rotational torque can be prevented and, therefore, a torque sensor exhibiting excellent detection accuracy can be provided.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A torque sensor comprising:

a first shaft a second shaft co-axially aligned with the first shaft;

a torsion bar connected between said first shaft and said second shaft;

a sensing device connected to said first shaft for detecting a relative rotation between said first and second shafts, said sensing device including a drive portion having a first contact surface; and an actuator portion connected to the second shaft, said actuator portion having a second contact surface which is positioned relative to the first contact surface of the drive portion of said sensing device such that the relative rotation between the first and second shafts causes the first contact surface of the drive portion to contact the second contact surface of the actuator portion, wherein said sensing device is provided with a restoring spring for biasing said drive portion toward said actuator portion, and wherein said first contact surface of the drive portion and said second contact surface of the actuator portion are respectively curved such that the contact between said first contact surface and said second contact surface occurs at a single point of contact.

2. A torque sensor according to claim 1, wherein said sensing device is a variable resistor.

3. A torque sensor according to claim 1, wherein said sensing device is a slide-operation-type variable resistor.

4. A torque sensor, comprising:

a first shaft;

a second shaft co-axially aligned with the first shaft;

a torsion bar connected between said first shaft and said second shaft;

a sensing device connected to said first shaft for detecting a relative rotation between said first and second shafts, said sensing device including a drive portion having a first contact surface; and an actuator portion connected to the second shaft, said actuator portion having a second contact surface which is positioned relative to the first contact surface of the drive portion such that the relative rotation between the first and second shafts causes the first contact surface of the drive portion to contact the second contact surface of the actuator portion, wherein said sensing device is provided with a restoring spring for biasing said drive portion toward said actuator portion, and wherein said first contact surface of the drive portion and said second contact surface of the actuator portion are respectively curved such that the contact between said first contact surface and said second contact surface occurs at a single point of contact, and wherein said second shaft is provided with a stopper which is positioned such that said drive portion of said sensing device is located between said stopper and said actuator portion.

5. A torque sensor, comprising:

a first shaft;

a second shaft co-axially aligned with the first shaft;

a torsion bar connected between said first shaft and said second shaft;

a sensing device connected to said first shaft for detecting a relative rotation between said first and second shafts, said sensing device including a drive portion having a first contact surface; and an actuator portion connected to the second shaft, said actuator portion having a second contact surface which is positioned relative to the first contact surface of the drive portion such that the relative rotation between the first and second shafts causes the first contact surface of the drive portion to contact the second contact surface of the actuator portion, wherein said sensing device is provided with a restoring spring for biasing said drive portion toward said actuator portion, wherein said first contact surface of the drive portion and said second contact surface of the actuator portion are respectively curved such that the contact between said first contact surface and said second contact surface occurs at a single point of contact, wherein said sensing device is a variable resistor, and wherein said second shaft is provided with a stopper which is positioned such that said drive portion of said sensing device is located between said stopper and said actuator portion.

6. A torque sensor, comprising:

a first shaft;

a second shaft co-axially aligned with the first shaft;

a torsion bar connected between said first shaft and said second shaft;

a sensing device connected to said first shaft for detecting a relative rotation between said first and second shafts, said sensing device including a drive portion having a first contact surface; and an actuator portion connected to the second shaft, said actuator portion having a second contact surface which is positioned relative to the first contact surface of the drive portion such that the relative rotation between the first and second shafts causes the first contact surface of the drive portion to contact the second contact surface of the actuator portion, wherein said sensing device is provided with a restoring spring for biasing said drive portion toward said actuator portion, wherein said first contact surface of the drive portion and said second contact surface of the actuator portion are respectively curved such that the contact between said first contact surface and said second contact surface occurs at a single point of contact, wherein said sensing device is a slide-operation-type variable resistor, and wherein said second shaft is provided with a stopper which is positioned such that said drive portion of said sensing device is located between said stopper and said actuator portion.

7. A torque sensor comprising:

a first shaft;

a second shaft co-axially aligned with the first shaft;

a torsion bar connected between said first shaft and said second shaft;

a sensing device connected to said first shaft for detecting a relative rotation between said first and second shafts, said sensing device including a drive portion having a first contact surface; and an actuator portion connected to the second shaft, said actuator portion having a second contact surface which is positioned relative to the first contact surface of the drive portion such that the relative rotation between the first and second shafts causes the first contact surface of the drive portion to contact the second contact surface of the actuator portion, wherein said sensing device is provided with a restoring spring for biasing said drive portion toward said actuator portion, wherein said first contact surface of the drive portion and said second contact surface of the actuator portion are respectively curved such that the contact between said first contact surface and said second contact surface occurs at a single point of contact, wherein said sensing device is an encoder, and wherein said second shaft is provided with a stopper which is positioned such that said drive portion of said sensing device is located between said stopper and said actuator portion.

* * * * *